United States Patent [19]

Wallin et al.

[11] 3,715,726

[45] Feb. 6, 1973

[54] SELECTIVE TONE SIGNALLING APPARATUS

[75] Inventors: Gary P. Wallin, Manchester; Gary N. Stapleford, Nashua, both of N.H.

[73] Assignee: Comex Systems, Inc., Manchester, N.H.

[22] Filed: Sept. 16, 1971

[21] Appl. No.: 181,165

[52] U.S. Cl. ................340/171 PF, 328/61, 340/311

[51] Int. Cl. ..........................H03k 1/00, H03k 21/36

[58] Field of Search.....340/171 R, 171 PF, 311, 351; 179/84 VF; 328/27, 30, 39, 48, 50, 61; 307/271; 235/92

[56] References Cited

UNITED STATES PATENTS

| | | | |
|---|---|---|---|
| 3,464,018 | 8/1969 | Cliff | 328/61 |
| 3,568,069 | 3/1971 | Gabor | 328/48 X |
| 3,621,403 | 11/1971 | Sefy | 328/48 X |
| 3,657,658 | 4/1972 | Kubo | 307/271 X |

*Primary Examiner*—Donald J. Yusko
*Attorney*—Robert R. Hubbard

[57] ABSTRACT

Sequential tone generator useful in paging applications. Three digit call numbers are entered into a register for temporary storage from an input device. Values indicative of the tones in the tone repertoire are stored in a first memory. Encoder values indicative of a desired tone encoding scheme are stored in a second memory. The stored call number is employed to address the encoder values of the second memory and to modify them so as to form the first memory addresses of the tone values specified by the call number. The addressed tone values are employed as divisor values in a frequency divider network to generate the tones.

10 Claims, 3 Drawing Figures

SELECTIVE TONE SIGNALLING APPARATUS

BACKGROUND OF INVENTION

A. Field of Invention

This invention relates to novel and improved signalling apparatus and in particular to signalling apparatus which selectively generates sequences of tone or frequency encoded signals. Signalling apparatus of this type is useful, for example, in selective calling applications. In one selective calling application, known as paging, a broadcast station transmits calls consisting of tone encoded signal sequences to subscribers who carry paging receivers with each receiver being tuned to a unique tone code. When the tone code of a particular receiver is broadcast, only that receiver emits an alarm, such as an audie beep, thereby alerting the subscriber that he is being paged or called.

B. Prior Art

In the prior art, tone codes have been chosen or selected from a repetoire or set of tones by means of coded combinations of digits ( call numbers ) selectively provided by a suitable input device, such as a keyboard, a telephone dialer, and the like. These prior art paging devices have been relatively expensive since they generally employ separate oscillators for each tone in the set. Each selected digit combination activates tone timing sequence circuitry and oscillator select circuitry so as to select the oscillators which generates the tones of the selected code in sequence.

A variety of different tone encoding schemes are currently in use. According to some of these schemes, a three digit call number is employed to select two tones from a set of 30 or 31 tones for sequential generation. The tones are divided into three groups of 10 tones each. One of the three digits selects two of the code groups and the two other digits select tones within the selected code groups. For example, the call number 175 might be employed in the following manner for tone groups identified as A, B and C. The "hundreds" digit, 1, specifies that the first tone will be chosen from group B and that the second tone till be chosen from group A. The "tens" digit, 7, selects the first tone from the group B tones and the "units" digit, 5, selects the second tone from the group C tones.

In encoding schemes employing 31 tones, the thirty-first tone is employed as a diagonal tone. Whenever the call number calls for the same tone to be generated twice from the same code group, the diagonal tone is automatically substituted for the first tone. For example, the call number, 455, selects the fifth tone in group C twice. Therefore that first tone transmitted will be the diagonal tone, and the second tone will be the fifth tone in group C.

The design of a pager apparatus is therefore dictated by the particular encoding scheme to be employed. Prior art pager designs were so constrained that the entire unit would have to be redesigned in order to accommodate another encoding scheme.

BRIEF SUMMARY OF INVENTION

An object of the present invention is to provide novel and improved signalling apparatus.

Another object is to provide signalling apparatus which employs selective sequential tone signalling.

Still another object is to provide paging apparatus in which digital circuits are employed for tone selection and generation.

Yet another object is to provide paging apparatus in which tone encoding is programmable.

A further object is to provide a relatively inexpensive paging apparatus which employs only one oscillator.

In brief, signalling apparatus embodying the invention includes a first memory for storing values indicative of the tones in a tone repetoire at different addressable locations therein. A suitable input device provides call numbers in the form of digit codes for temporary storage in a register. A memory readout network is responsive to the stored codes to address in sequence the tone values corresponding to a stored call number. A programmable frequency divider driven by a stable oscillator employs the addressed tone values as program values so as to generate in sequence the tone signals indicative of the stored call number.

In a preferred embodiment the memory readout network includes a second memory for storing values indicative of a tone encoding scheme. One of the digit codes of the stored call number is employed to address the tone encoder values from the second memory during first and second tone generating intervals. Also employed in this address code is a control signal which has different values during the different tone intervals so as to cause different locations of the second memory to be addressed during the two tone intervals. The first memory addresses are then formed by adding the addressed tone encoder values to different ones of the other digit codes during the two tone intervals. Thus, both the tone repetoire and the tone encoder scheme can be readily changed by merely changing the values stored in the two memories.

Also in a preferred embodiment, the stored tone values are functions of the periods of the tones. The frequency divider includes a counter which counts from the program value (addressed tone value) to its maximum value (all 1's for a binary counter). Each time the maximum value is attained, the addressed tone value is reloaded into the counter such that the counter emits a train of output pulses. The output pulse train is converted to a square wave at the frequency of the addressed tone value.

BRIEF DESCRIPTION OF THE DRAWINGS

In the accompanying drawings, like reference characters denote like structural elements, and.

DESCRIPTION OF PREFERRED EMBODIMENT

Figure 1:
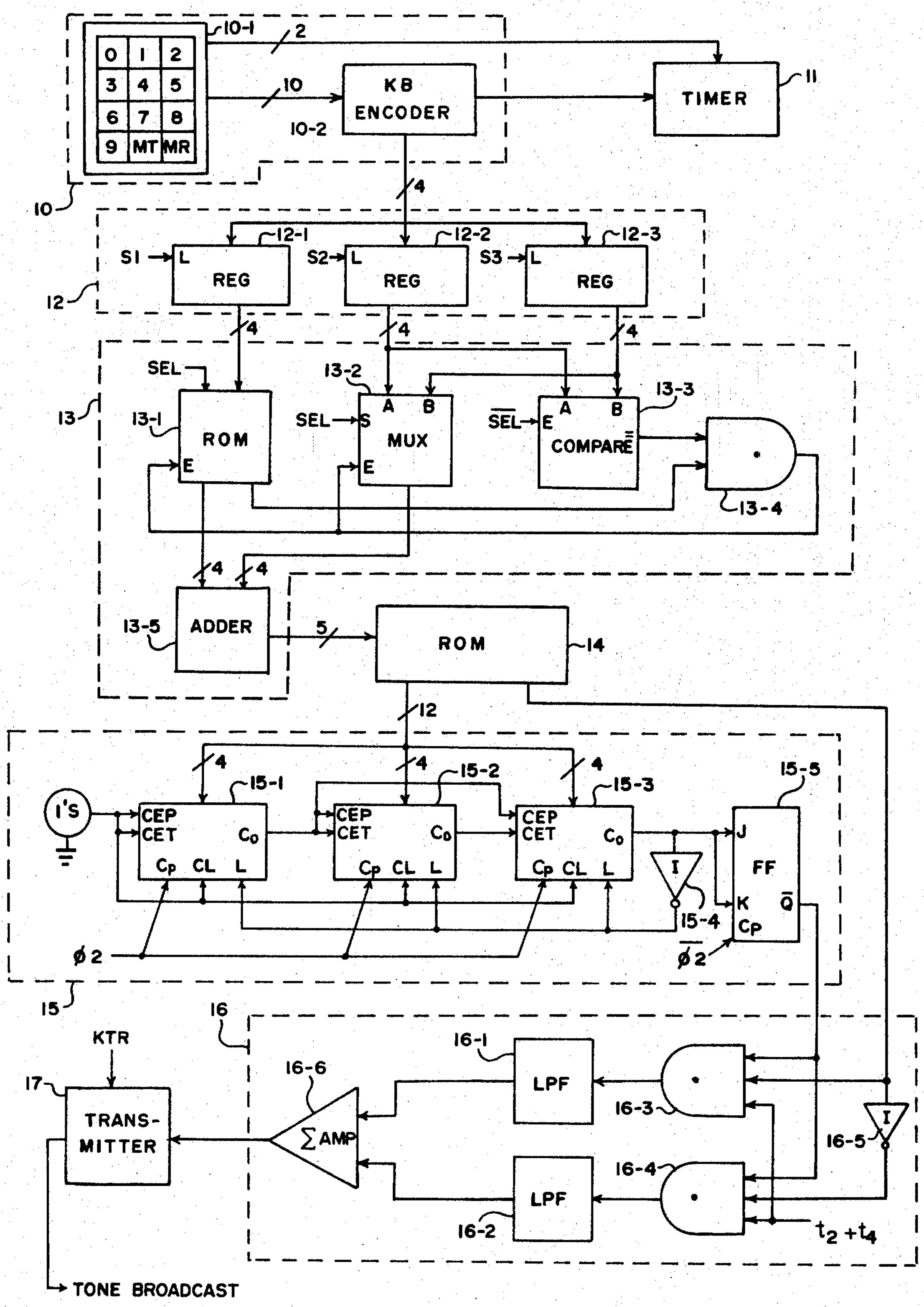
FIG. 1 is a block diagram of signalling apparatus embodying the present invention.

It is contemplated that signalling apparatus embodying the invention may be employed with any desired call number length to generate any desired number of sequential tones. However, by way of example and completeness of description, the invention is herein illustrated for three digit call numbers and two tone sequential generation.

Signalling apparatus embodying the invention has been illustrated in the drawings with a number of blocks containing known circuits which are actuated by bi-level electrical signals applied thereto. When the signal is at one level ( say the high level ) it represents the binary digit 1; and when it is at another level, it represents the binary digit 0. Also, to simplify the discussion, rather than speaking of an electrical signal being applied to a block or logic stage, it is sometimes stated that a 1 or 0 is applied to the block or stage.

The register, decoder, adder, multiplexer, flip-flop, counter and logic gates or blocks shown in the drawing may take on any suitable form. For example, these circuits may be selected from either or both of the following catalogs: Fairchild, TTL Family, Oct., 1970, a catalog of Fairchild Semiconductor, a division of Fairchild Camera & Instrument Corp.; or MSI/TTL Integrated Circuits from Texas Instruments, Bulletin CB–125, a catalog of Texas Instrument, Inc. Coincidence gates are represented on the drawing with the conventional AND gate symbol having a dot therein and OR gates are represented by the conventional OR gate symbol with a + contained therein. A small circle at the output of these gates represents a signal inversion such that the AND and OR gates become NAND and NOR gates, respectively. When a signal flow path contains more than a single lead or conductor, a slash mark is made through the path together with an adjacent number indicating the number of conductors in the path. One final note before proceeding with the description, the signal leads have in some cases been interrupted and labeled rather than shown as continuous leads so as to avoid cluttering of the drawing.

Signalling apparatus embodying the invention is shown in FIG. 1 to include a suitable input device 10 for providing three digit call numbers for temporary storage in a register 12. A memory reading network 13 responds to the stored call number to address a memory 14. The memory 14 has stored therein at different addressable locations values indicative of each of the tones in a tone repetoire or set from which the tone codes are to be selected. Preferably, these values are functions of the periods of the tones or frequencies in the set. Each three digit call number specifies a unique pair of stored tone values. The memory read network 13 interprets the stored call number and generates in sequence the addresses of the two specified tone values. The addressed tone values are loaded into a counter included in a programmable frequency divider. The counter is arranged to count a train of clock pulses $\phi$ from the loaded value to a maximum count value, which, for a binary counter, is the all 1's state. Each time the all 1's state is reached, the counter 15 emits an output pulse and the addressed value is reloaded into the counter. The counter output pulse is converted to a square wave by a divide by two circuits (flip-flop) which has the frequency of the addressed tone period. A filter and waveshaping network 16 serves to shape the counter output pulse train into a nearly sinusoidal wave, the frequency of which will be encoded in accordance with the stored call number. The tone encoded sinusoidal wave is then applied to a transmitter 17 which modulates a carrier signal with the tone encoded signal to form a broadcast signal for broadcast in a paging area.

The input device 10 may take on any suitable form, such as a keyboard, telephone dialer, and the like. By way of example, the input device 10 has been illustrated as a keyboard having a set of keys 10–1 and an encoder 10–2. As shown in FIG. 1, there are 12 keys including the numeric digits 0 through 9, a manual transmit key (MT) and a manual reset key (MR). To make a call, an operator merely depresses the keys corresponding to the call number in sequence. Thus, keys 1, 7 and 5 would be depressed in that order to call the subscriber whose call number 175. If an error is made (e.g., the wrong key being depressed), the the operator merely depresses the manual reset key to clear the system for correct entry.

As is known in the art, there is an output lead for each key and when a key is depressed a 1 will be present on its corresponding lead. The output leads of the 10 numeric keys are applied to the keyboard encoder 10-2 and the output leads of the MT and MR keys are applied to the system timer 11. The encoder 10–2 may be any suitable device which converts the one of 10 output code of the keys to a more suitable code for processing. In the illustrated embodiment, a four bit binary coded decimal code is employed and the encoder 10-2 may be the circuit model HD 0165–5, a product of Harris Semiconductor, a division of Intertype Corporation. The encoder also emits a strobe to the timer 11 each time a numeric key is depressed.

Figure 2:
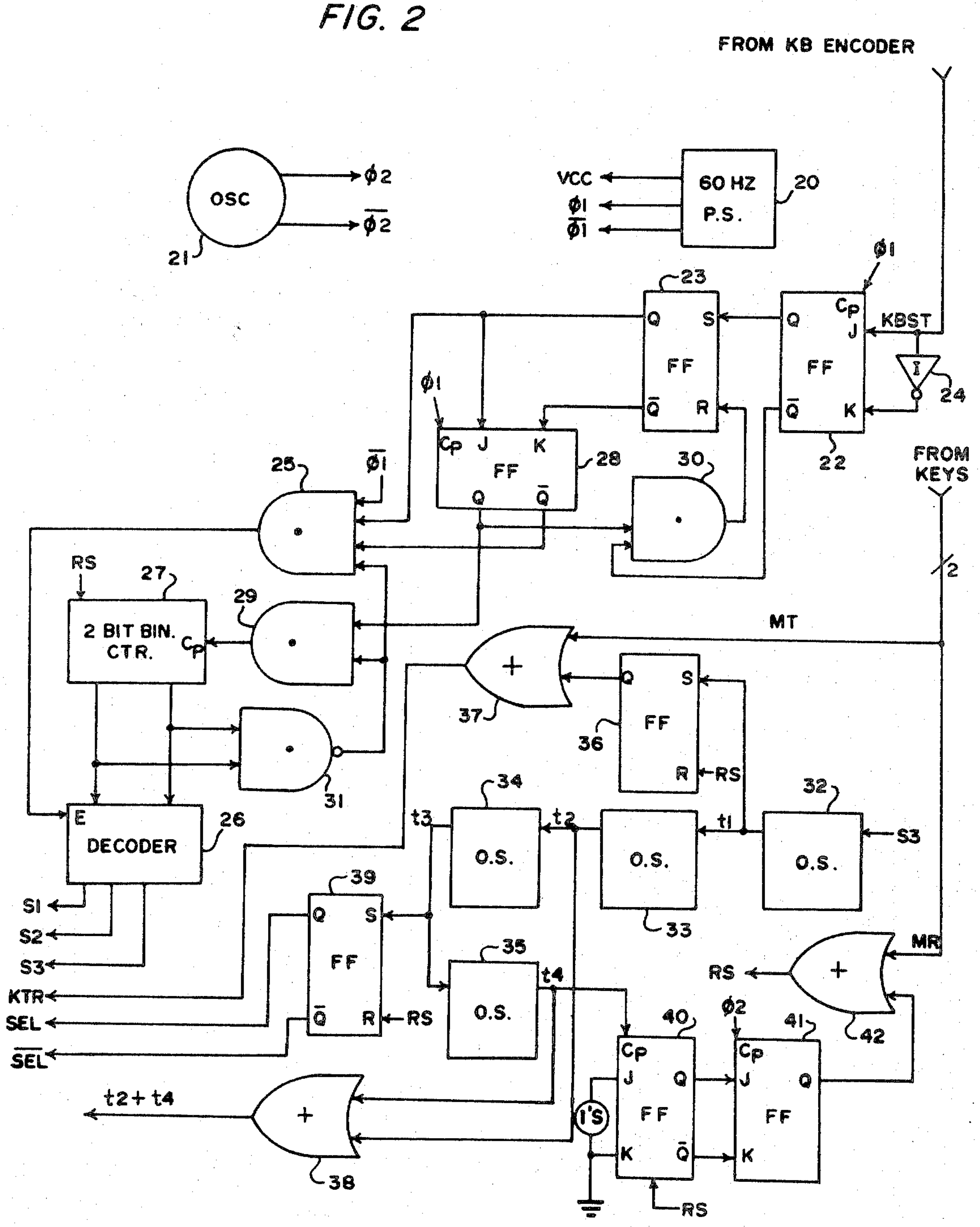
FIG. 2 is a block diagram, in part, and a logic schematic, in part, of a tone timer network for the FIG. 1 signalling apparatus.
Figure 3:
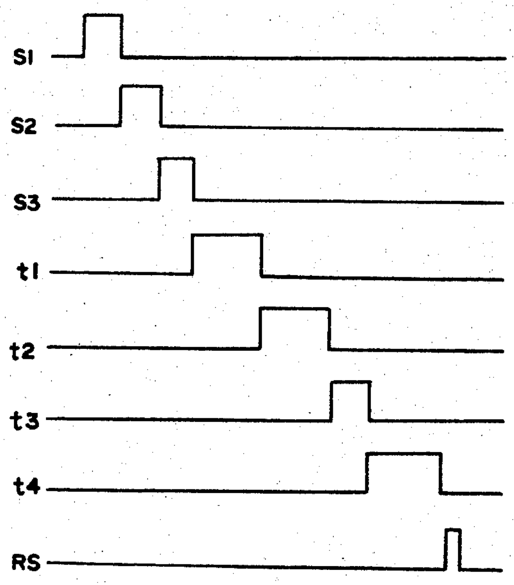
FIG. 3 is a waveform diagram showing the timing signals generated by the tone timer network of FIG. 2.

The register 12 is shown to include three sections 12–1, 12–2 and 12–3, each of which is adapted to receive the code of a different digit of the call number. Thus, the sequential load pulses S1, S2 and S3 (also see FIG. 3) are employed to load the "hundreds" digit code, the "tens" digit code and the "units" digit code into the register sections 12–1, 12–2 and 12–3, respectively Before proceeding with the description, it is well to discuss the timer 11 which provides the sequential load pulses S1 to S3 as well as the tone interval timing which controls the tone generation. The timer is shown in FIG. 2 to include a block 20 which derives from a standard 60 Hz supply a d. c. voltage $V_{cc}$ and a 60 Hz clock $\phi 1$ and its complement $\overline{\phi 1}$. The voltage $V_{cc}$ is employed to power all of the circuits in the paging system. For convenience, the connections to $V_{cc}$ have been omitted. An oscillator 21, which may be a stable crystal type, provides a high frequency clock $\phi 2$ and its complement $\overline{\phi 2}$ which are used by the counter 15 to generate the tone signals.

The timer circuitry employs a two bit binary counter 27 to count the keyboard strobe pulses KBST to load pulses S1 to S3. Each time the keyboard strobe KBST appears, a J-K flip-flop 22 and an R-S flip-flop 23 will be set on the next falling edge of the clock $\phi 1$. Flip-flop 22 is employed to eliminate contact bounce of the keys. To this end, the KBST signal is applied to its J input and the complement of KBST is applied to the K input via an inverter 24. The Q output Flip-flop 22 is applied to the S input of flip-flop 23.

At the same time that the falling edge of the clock sets flip-flop 22 and 23, AND gate 25 applies a 1 to the enable input E of a decoder 26 which responds to the all 0's state of the counter 27 to emit the load pulse S1. On the next high going edge of the clock $\phi 1$, the output of AND gate 25 will become a 0 to disable decoder 26, thereby terminating the load pulse S1. When the clock $\phi 1$ again goes low, J-K flip-flop 28 sets so as to enable AND gate 29 to apply a 1 to the count input of counter 27.

When the depressed key is released, KBST will become a 0, thereby causing flip-flop 22 to reset on the next falling edge of the clock $\phi 1$. AND gate 30 senses this and resets flip-flop 23 by applying a 1 to its R input. When the clock again goes low, flip-flop 28 will be reset so as to cause an AND gate 29 to apply a 0 to counter 27. The 1 to 0 transition of gate 29 clocks the counter 27 to a value of binary 1.

The foregoing sequence is repeated each time a new key is depressed. NAND gate 31 detects the generation of the third strobe KBST by sensing the all 1's state of counter 27. The output of gate 31 becomes a 0 at this time and remains a 0 until the system is reset either manually by the MR key or automatically at the end of the sequential tone generations. This serves to lock out responses to subsequent key depressions until after the system has processed a correctly entered call number.

The last of "units" load pulse S3 is also employed to initiate the tone interval timing chain which includes the cascaded one shot multivibrators 32 through 35. The falling edge of load pulse S3 causes one shot 32 to fire to produce a timing pulse t1 which serves as a transmitter warm-up delay. The rising edge of t1 causes R-S flip-flop 36 to set so as to emit a transmitter keying signal KTR via OR gate 37. The KTR signal, which serves to turn the transmitter on, will remain a 1 until flip-flop 36 is reset by the system reset signal RS. The KTR signal can also be generated by manually holding the MT key in a depressed condition. To this end, the MT key lead is also applied to the OR gate 37.

On the falling edge of t1, one shot 33 fires to produce the first tone generating signal t2. The signal t2 and the second tone interval signal t4 are ORRED by an OR gate 38 to provide the signal *t*2 +*t*4 which is employed to enable the filter and waveshaping network 16 (FIG. 1.) The falling edge of *t*2 fires one shot 34 which produces an inter-tone delay pulse *t*3. The leading edge of *t*3 sets a tone control select flip-flop 39 which provides the SEL control signal for use by the memory read network 13 in FIG. 1.

The falling edge of t3 fires one shot 35 which produces the second tone interval pulse t4. In addition to being applied to OR gate 38, the signal t4 is applied to the clock input CP of J-K flip-flop 40. Flip-flop 40 has its J input connected to source of 1's (e.g., Vcc) and its K input to a source of 0's (e.g., ground). The falling edge of *t*4 sets flip-flop 40 whereby J-K flip-flop 41 will also be set on the next falling edge of the clock O2. The Q output of flip-flop 41 is ORRED in OR gate 42 with the MR (manual reset) lead to produce the system reset signal RS. The RS signal is employed as a d. c. reset for flip-flop 40. When flip-flop 40 has been reset, the next falling edge of 2 resets flip-flop 41 to complete the resetting of the system. The RS signal is employed to reset the counter 27, the transmitter turn on flip-flop 36, the tone select flip-flop 39, and the one shots 32 to 35.

Returning now to the description of the FIG. 1 tone signalling embodiment, the memory read network includes a second memory 13–1, a multiplexer (MUX) 13–2, a comparator 13–3, an AND gate 13–4 and an adder 13–5. The second memory has stored therein at addressable locations tone encoder values indicative of a desired tone encoding scheme. The "hundreds" digit code stored in register section 12–1 is employed together with the SEL signal to provide a five bit address for memory 13–1. The SEL signal has a value of 0 during the first tone interval (*t*2) and a value of 1 during the second tone interval (*t*4). This causes the same "hundreds" digit code to address an encoder value from a first group of values during the first tone interval and another encoder value from a second group of values during the second tone interval. If diagonal tones are included in the encoding scheme, some of the values in each group will be identical.

The adder 13–5 adds the tone encoder value addressed from the first group to the "tens" digit code during the first tone interval and the encoder value addressed from the second group to the "units" digit code during the second tone interval. The MUX 13–2 is controlled by the SEL signal to multiplex the "tens" and "units" digit codes to the adder 13–5 during the two tone intervals. Only 4 bits of the 5 bit encoder values are applied to the adder. The adder output consists of four sum bits and a carry bit to form a 5 bit address for the tone value memory 14.

The other bit of the 5 bit encoder values stored in a second memory 13–1 are employed for diagonal tone encoding. To this end, the fifth bit of each addressed tone encoder value is applied to an AND gate 13–4. This bit is a 1 only for those values in the first encoder value group which have identical counter parts in the second group. The comparator 13–3 provides a 1 to the other input of AND gate 13–4 only when the "tens" and "units" digits are identical during the first tone interval. The SEL signal disables comparator 13–3 at the end of the first tone interval. Thus, when the "tens" and "units" digits are identical and when the "hundreds" digit address a tone encoder value having a 1 in the fifth bit position, the output of AND gate 13–4 will become a 1. This causes both the memory 13–1 and the MUX 13–2 to be disabled during the first tone interval (*t*2). This results in a memory output of all 1' s and a MUX output of all 0's. The output of adder 13–5 will also be all 1's, which is the address in memory 14 of the diagonal tone value. During the second tone interval, comparator 13–3 and gate 13–4 are not active and the addressed encoder value is added to the "units" digit code to normally generate the address of the specified tone value in memory 14.

The memories 13–1 and 14 may be any suitable memory including read only as well as read and write types. By way of example, the memories have been illustrated as read only memories (ROM). One suitable memory which may be employed is a 32×8 bit, Model 8223,a product of Signetics Corporation of Sunnyvale, California. In order to achieve the 13 bit length illustrated for memory 14, two of the 32×8 memories can be operated in parallel.

The tone values addressed from memory 14 have 13 bit lengths, 12 of which represent a function of the period of the tone and the other of which serves as a control signal for the filter network 16. The 12 bit values are parallel loaded into the counter of divider 15. The counter may be any suitable binary counter and, by way of example, is shown to include three four bit synchronous sections 15–1, 15–2 and 15–3, each of which may be a model SN54161, a product of Texas Instruments, Inc. The counter sections are cascaded for high speed counting operation in the manner set forth in Data Sheet DL-S 7011385 of Texas Instruments, Inc. To this end, the CEP and CET (count enables) of the first section 15-1 and the CL (clear) inputs of 9I sections are connected to a source of 1's. The high frequency clock $\phi 2$ is applied to the $Cp$ (clock) input of each section. For convenience, only the inputs of section 15-1 have been labeled. The carry out $Co$ of the first section is applied to the CET and CEP inputs of the second section and to the CEP input of the third section. The $Co$ output of the second section is applied to the CET input of the third section. The $Co$ output of the last section is taken as the counter output. Unlike, the aforementioned Data Sheet, the complement of the $Co$ output section 15-3 (derived by inverter 15-4) is employed to enable the parallel load L input of each section.

In operation, the $Co$ output of the third section 15-3 is a 1 only when the count value is all 1's. This condition is sensed by inverter 15-4 to enable the counter sections for parallel loading. On the next falling edge of the clock $\phi 2$, the tone value being addressed in memory 14 will be loaded into counter sections 15-1 to 15-3. Thus, the illustrated synchronous counter loses one clock pulse for each counter cycle. Because of this, the values stored in memory 14 are essentially equal to T-1, where T represents the periods of the tones. Since the counter counts up to the all 1's state, the T-1 values are stored in one's complement form.

The $Co$ output of section 15-3 consists of a train of pulses which have a pulse width on the order of two periods of the clock $\phi 2$ whereby the duty cycle is considerable less than 50 percent. In order to improve the power output and eliminate even harmonics, this pulse train is converted to a square wave (50 percent duty cycle) by a J-K flip-flop 15-5. Flip-flop 15-5 has its J and K inputs connected to the $\underline{Co}$ of counter section 15-3 and is clocked by the clock $\bar{\phi}2$ so as to provide a square wave output at one half the frequency of the $Co$ pulse train. Since flip-flop 15-5 divides the frequency of the $Co$ pulse train by two, the frequency of the clock $\phi 2$ is doubled.

The lower frequencies or tones in the tone set are generally an octave or more away from the higher frequencies. Accordingly, the filtering and waveshaping network 16 includes two low pass filters 16-1 and 16-2 with a crossover design such that third harmonics will be on the order of 37 db. down. The AND gates 16-3 and 16-4 serve to steer the higher frequency tones to the filter 16-1 and the lower frequency tones to the filter 16-2 under the control of the 13th bit of the tone values stored in memory 14. To this end, the 13th bit is applied to gate 16-3 and by way of an inverter 16-5 to gate 16-4. Thus, the 13th bit is a 1 for the higher frequencies and a 0 for the lower frequencies. The $t2+t4$ signal is also applied to gates 16-3 and 16-4 to assure that they are enabled only during the tone generating intervals $t2$ and $t4$. The filtered tone outputs from filters 16-1 and 16-2 are summed together in a conventional summing amplifier 16-6, the output of which is applied to the transmitter 17. The filters 16-1 and 16-2 also serve the purpose of shaping the square wave output of counter 15 into a nearly sinusoidal wave. These filters may suitably be conventional active low pass filters.

There has been described sequential tone signalling apparatus embodying the invention. The nearly all digital circuit illustrated embodiment is attractive since advantage can be taken of integrated digital circuit technology. In addition, the digital nature of the call number codes lends itself to digital recording techniques whereby a record of the calls made can be recorded (e.g., on paper or magnetic tape) for later playback. Also, the digit codes can be employed to provide the operator with a visual display of the call number being paged. It should be apparent that timing networks other than the one illustrated in FIG. 2 may be employed to generate tone timing and register load signals. Also, frequency division networks other than the illustrated synchronous binary counter may be employed.

What is claimed is:

1. Signalling apparatus for generating signal sequences, the signals of each sequence being chosen from a set of signal tones, said apparatus comprising:
- input means for providing call numbers, each comprised of a plurality of digit codes and each corresponding to a different tone sequence;
- a register responsive to said input means for temporarily storing each said provided call number;
- a memory for storing values indicative of the tones in said set at different addressable locations therein;
- memory readout means responsive to a call number stored in said register to address in sequence the tone values corresponding to the stored call number; and
- means responsive to said addressed values to generate in sequence the tone signals indicative of said addressed tone values.

2. The invention as set forth in claim 1
- wherein said sequential tone generating means includes:
- means for providing a clock pulse train;
- a counter for counting the pulses of said train so as to emit an output pulse each time a predetermined count value is attained:
- means responsive to said output pulse for loading a currently addressed tone value into said counter such that the counter repetitively counts from said loaded tone value to said predetermined value to emit a train of output pulses for each addressed tone value; and
- means for shaping the output pulse train of said counter to produce a nearly sinusoidal signal, the frequency of which corresponds to said loaded tone value.

3. The invention as set forth in claim 2
- wherein said tone values are directly proportional to the periods of the tones in said set; and
- wherein said predetermined count value is the highest state attainable by said counter.

4. The invention as set forth in claim 1
- wherein said memory readout means includes:
- a second memory for storing values indicative of a tone encoding scheme;
- means including a first digit code of a stored call number for addressing said encoder values; and
- means responsive to said addressed encoder values and to the other digit codes in the stored call number to sequentially generate the addresses of the tone values specified by the stored call number.

5. The invention as set forth in claim 4 and further including:

a tone timer for generating first and second timing signals corresponding to first and second sequential tone generating intervals, respectively, said tone timer further including control means for producing a control signal having first and second values during the first and second intervals, respectively; and wherein said encoder value address means further includes said control means to cause said first digit code to address a first group of encoder values during the first tone interval and a second group of encoder values during the second tone interval; and wherein said tone value addresses include first and second tone value addresses generated during said first and second tone intervals, respectively, by said tone value generating means.

6. The invention as set forth in claim 5 wherein said tone value address generating means includes;

a multiplexing network responsive to said control signal to select second and third digit codes of said stored call number during the first and second tone intervals, respectively; and means for logically combining the addressed first and second group encoder values with the selected second and third digit codes to produce said first and second tone value addresses, respectively.

7. The invention as set forth in claim 6 wherein said logical combining means is an adder which algebraically sums the addressed encoder values with the multiplexer selected digit code values to produce said tone value addresses.

8. The invention as set forth in claim 7 wherein said tone value memory has a diagonal tone value stored therein;

wherein at least one of the first group values is identical to one of the second group values stored in the second memory;

wherein diagonal tone means responds to the addressing of said one first group value and to the identity of the second and third digit codes to cause said second memory, said multiplexer and said adder to generate the address of said diagonal tone.

9. The invention as set forth in claim 8 wherein said sequential tone generating means includes:

means for providing a clock pulse train;

a counter for counting the pulses of said train so as to emit an output pulse each time a predetermined count value is attained;

means responsive to said output pulse for loading a currently addressed tone value into said counter such that the counter repetitively counts from said loaded tone value to said predetermined value to emit a train of output pulses for each addressed tone value; and means for shaping the output pulse train of said counter to produce a nearly sinusoidal signal, the frequency of which corresponds to said loaded tone value.

10. The invention as set forth in claim 9 wherein said tone values are directly proportional to the periods of the tones in said set; and wherein said predetermined count value is the highest state attainable by said counter.

* * * * *